Figure 1:
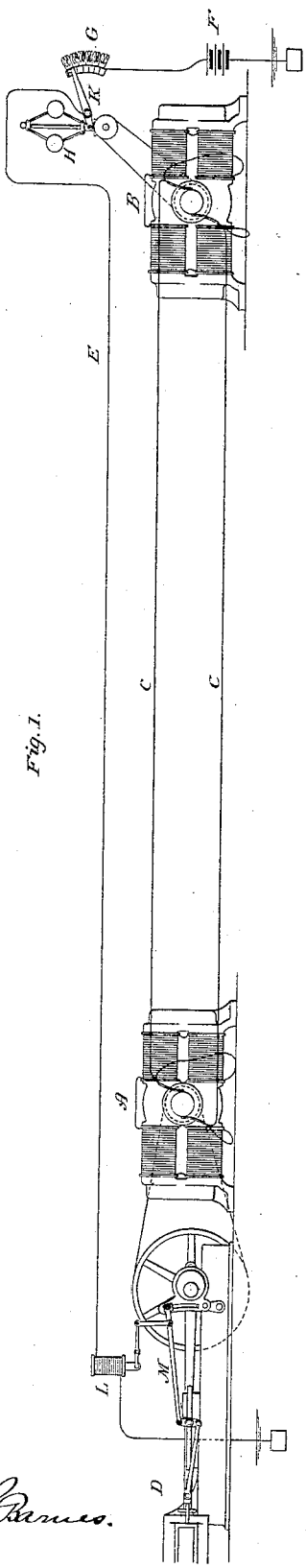

(No Model.)

2 Sheets—Sheet 1.

E. WESTON.
SYSTEM FOR THE ELECTRICAL TRANSMISSION OF POWER.

No. 292,721.   Patented Jan. 29, 1884.

Attest:
Raymond F. Barnes.
W. H. Doggett.

Inventor:
Edward Weston
By Parker W. Page
atty.

(No Model.)
2 Sheets—Sheet 2.

E. WESTON.
SYSTEM FOR THE ELECTRICAL TRANSMISSION OF POWER.

No. 292,721. Patented Jan. 29, 1884.

Attest:
Raymond F. Barnes.
W. H. Doggett.

Inventor:
Edward Weston
By Parker W. Page, atty.

UNITED STATES PATENT OFFICE.

EDWARD WESTON, OF NEWARK, NEW JERSEY, ASSIGNOR TO THE UNITED STATES ELECTRIC LIGHTING COMPANY, OF NEW YORK, N. Y.

SYSTEM FOR THE ELECTRICAL TRANSMISSION OF POWER.

SPECIFICATION forming part of Letters Patent No. 292,721, dated January 29, 1884.

Application filed July 31, 1883. (No model.)

*To all whom it may concern:*

Be it known that I, EDWARD WESTON, a subject of the Queen of Great Britain, residing at Newark, in the county of Essex and State of New Jersey, have invented certain new and useful Improvements in Systems for the Electrical Transmission of Power, of which the following is a specification, reference being had to the drawings accompanying and forming a part of the same.

My invention relates to systems for the transmission of power for general useful purposes by the employment of dynamo-electric generators and motors, the object being the regulation or control of the electric energy developed and transmitted.

It is well known that when a motor in circuit with a dynamo-electric machine is driven by the latter it attains a certain speed of rotation when unloaded, determined by the counter electro-motive force developed. At such times the only energy expended is that consumed in overcoming friction, the inertia of the armature, and the resistance of the conductors. If the motor be then caused to perform a given amount of work, a proportionate amount of energy is expended in performing this work and the speed of rotation of the motor falls. For the best working conditions it is obviously essential that this be avoided, and that whatever the load upon the motor within its practical working limits the speed should remain uniform; but with a generator constructed or arranged for developing a normally-constant electro-motive force such would not occur without some means of regulation. In systems of this kind the current is generally produced at a central station and conveyed for long distances to the motor or motors, and the methods of regulation heretofore resorted to, so far as my information extends, have involved the insertion in or withdrawal from the main circuit of a dead resistance. This, however, is difficult to accomplish when powerful currents are used, and is attended by a great loss, the current energy not expended in driving the motor being expended in overcoming the increased resistance.

In certain patents granted to me and in applications by me made I have shown and described a plan of avoiding this by a method of regulation which may be carried out in many various ways, certain of which are set forth in the patents and applications referred to. These involve generally the employment of a generator, a main or working circuit, and a motor included therein, and an independent regulating-circuit including devices controllable at or by the motor for varying the current produced by the generator, the action of such devices being to control the current generated or power transmitted without varying the speed at which the generator is driven, but by controlling the electrical conditions, as by varying the strength of the field-of-force magnets.

The subject of my present application is another method of carrying out this invention by varying or controlling the speed of the generator, and consequently the current produced thereby, by controlling the speed or action of the prime motor from which the generator is driven in proportion to variations in the load imposed upon the motor, and in consequence its speed. For instance, if the prime motor be a steam-engine, its effect in driving the generator may be controlled by an electro magnet or magnets in the regulating-circuit, which act to cut off steam at different points of the stroke, or to control the engine in other well-known ways.

Figure 2:
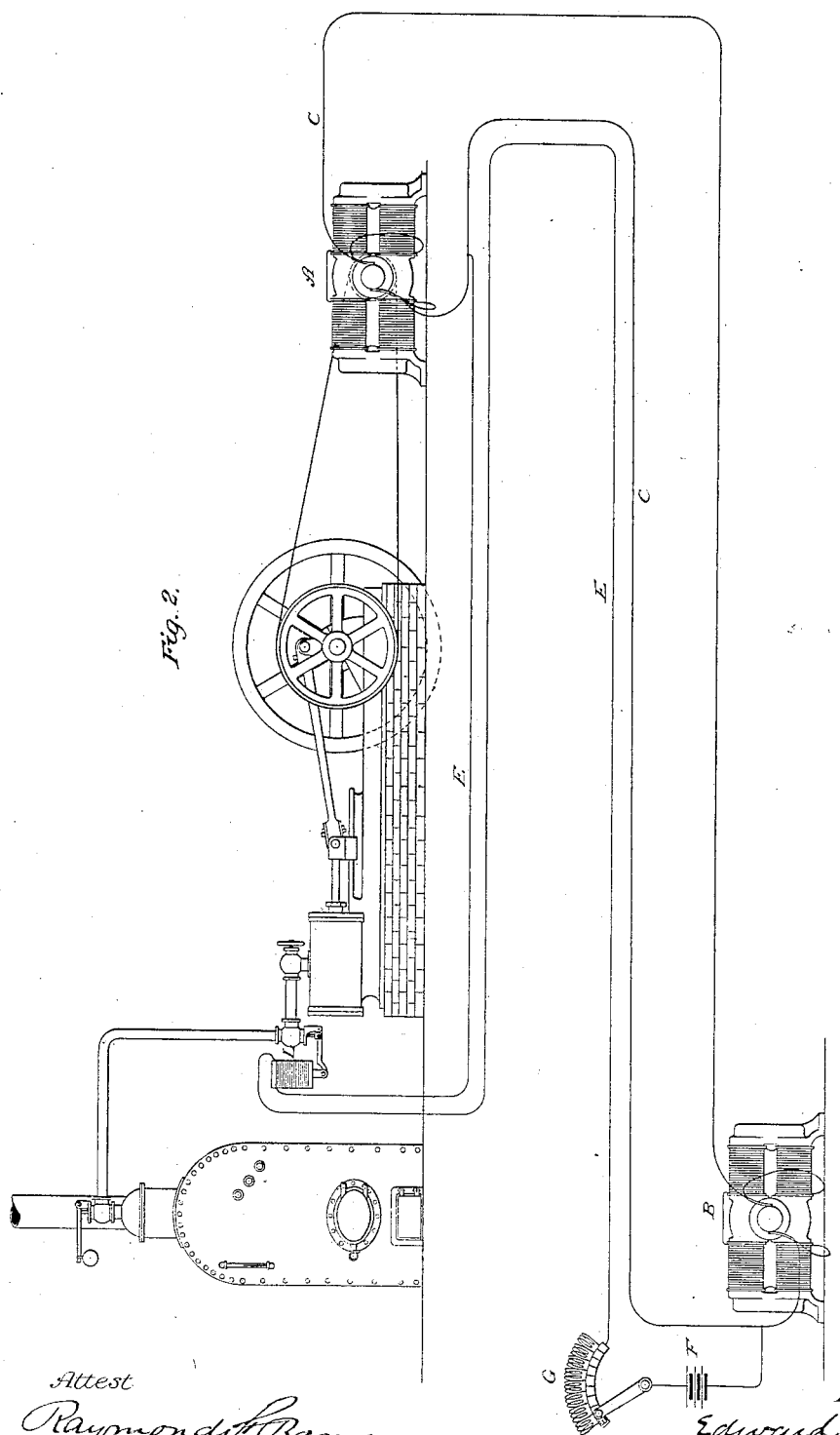

I have illustrated this system diagrammatically in the accompanying drawings, where Figure 1 illustrates the system invented by me, with a device under the control of the motor for fixing the point in the stroke of the engine driving the generator at which the steam is cut off. Fig. 2, the same system with an arrangement by which the generation of current is regulated by an electro-magnet that controls the throttle-valve of the driving-engine.

Referring to Fig. 1, A is a dynamo-machine, located at a given station; B, a motor in the circuit of the same; C C, the conductors of the main circuit; D, the engine driving the dynamo. E is an independent circuit running from the motor back to the generator station, and which, for convenience, is designated the "parallel" circuit. F is a battery included in the circuit E. G is a rheostat or variable resistance, also in the circuit; H, governor-balls, or any kind of centrifugal governor that is driven by the motor and caused to operate the rheostat, as by an arm, K, and to cut out resistance when the speed of the motor decreases and to throw in resistance when the speed runs up. L is an electro-magnet placed near the engine, and arranged to cut off the steam earlier or later in the stroke by raising or lowering the reciprocating connecting-rod M of a valve-gear such as is commonly used in the Porter-Allen engines. The construction of the apparatus for utilizing a magnet in this way is not described in detail, as it will be well understood and is only illustrated herein diagrammatically.

The operation of this system is as follows: If when the motor is running at a given rate of speed a greater load be imposed upon it, the tendency to slow down in consequence of such load is checked by the increase in current produced by the withdrawal of resistance in circuit E, the increased attraction of magnet or helix L, the raising of rod M, and the higher speed of the generator due to the greater power which the engine acquires when the steam is cut off later in the stroke. The reverse of this obviously takes place when the load on the motor is decreased.

In Fig. 2 the arrangement is substantially the same as that shown in the former figure, the magnet L being, however, employed in this instance to control the throttle-valve. Many ways of effecting this are now well known, and the particular construction of the apparatus necessary is therefore indicated only by showing a pivoted lever connecting the movable core of the magnet L with the stem of the throttle-valve. The circuit E in this figure is partly by one of the conductors C of the main circuit, such conductor being used simply as a ground.

The rheostat G may be controlled in the manner shown in Fig. 1, or in any other suitable way in which it will allow more or less current to flow through the circuit E, according to the speed of the motor, and by energizing to a corresponding degree the magnet L, to cause the latter to admit more steam to the cylinder of the engine when the motor slows up and less steam when the speed of the motor is accelerated.

I am aware that an electric motor has been included in the working-circuit of a dynamo-machine and employed for operating an engine governor, the arrangement being such that variations in current strength are prevented, and this I do not claim, broadly.

The present invention is obviously not limited to the particular devices used in conjunction with the generator and motor for varying the speed of the engine; but What I now claim as my invention, without claiming those features of novelty which are herein shown or described but not claimed, inasmuch as they are made the subject of other applications for Letters Patent, is—

1. In a system for the electrical transmission of power, the combination of a prime motor, a dynamo-electrical generator, a working-circuit, a single motor included therein at a distance from the generator, and adapted to perform work, as in driving machinery or the like, and devices for varying the speed or effect of the prime motor in driving the generator in proportion to variations in the load imposed upon the motor, said devices being controllable at or by the motor, as and for the purpose specified.

2. In a system for the electrical transmission of power, the combination of a steam-engine, a dynamo-electric generator driven thereby, a working-circuit, a motor included therein, an independent regulating-circuit, and means included therein for varying the speed of the engine, in substantially the manner set forth.

3. The combination, with a main line, a generator of electricity, and a motor included in the same, of an independent regulating-line parallel to the main line, devices therein for regulating the current produced by the generator, and a variable resistance at or near the motor for controlling the action or effect of such devices, as set forth.

In testimony whereof I have hereunto set my hand this 30th day of July, 1883.

EDWARD WESTON.

Witnesses:
RAYMOND F. BARNES,
W. FRISBY.